United States Patent
Sakurabu et al.

(10) Patent No.: US 10,001,621 B2
(45) Date of Patent: Jun. 19, 2018

(54) FOCUSING CONTROL DEVICE, FOCUSING CONTROL METHOD, FOCUSING CONTROL PROGRAM, LENS DEVICE, AND IMAGING DEVICE

(71) Applicant: FUJIFILM Corporation, Tokyo (JP)

(72) Inventors: Hitoshi Sakurabu, Saitama (JP); Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/590,019

(22) Filed: May 9, 2017

(65) Prior Publication Data
US 2017/0293106 A1    Oct. 12, 2017

Related U.S. Application Data

(63) Continuation of application No. PCT/JP2015/080321, filed on Oct. 28, 2015.

(30) Foreign Application Priority Data

Nov. 18, 2014   (JP) .................. 2014-233499

(51) Int. Cl.
*G02B 7/34*    (2006.01)
*G02B 7/09*    (2006.01)
(Continued)

(52) U.S. Cl.
CPC .............. *G02B 7/34* (2013.01); *G02B 7/09* (2013.01); *G06T 5/20* (2013.01); *H04N 5/23212* (2013.01)

(58) Field of Classification Search
CPC ... G02B 7/34; G02B 7/09; G02B 7/30; H04N 5/23212; H04N 5/142; H04N 5/208;
(Continued)

(56) References Cited

U.S. PATENT DOCUMENTS 4,447,719 A    5/1984 Ogasawara
4,561,749 A *  12/1985 Utagawa ............... G02B 7/346
                                                    250/204
(Continued)

FOREIGN PATENT DOCUMENTS

JP    S57-128307    8/1982
JP    S59-142506    8/1984
(Continued)

OTHER PUBLICATIONS

"International Search Report (Form PCT/ISA/210) of PCT/JP2015/080321", dated Jan. 26, 2016, with English translation thereof, pp. 1-4.

(Continued)

*Primary Examiner* — Pritham Prabhakher
(74) *Attorney, Agent, or Firm* — JCIPRNET

(57) ABSTRACT

A focusing control device includes a filter processing unit 11a which performs first filter processing selected from among a plurality of kinds of filter processing on each of a first signal group output from a plurality of phase difference detection pixels 52A and a second signal group output from a plurality of phase difference detection pixels 52B, a correlation calculation unit 11b which performs correlation calculation of the first signal group after the first filter processing and the second signal group after the first filter processing, and a lens position control unit 11c which controls a position of a focus lens based on the result of the correlation calculation. The filter processing unit 11a selects the first filter processing from among the plurality of kinds of filter processing based on subject condition information.

20 Claims, 13 Drawing Sheets

(51) Int. Cl.
*H04N 5/232* (2006.01)
*G06T 5/20* (2006.01)

(58) Field of Classification Search
CPC .... H04N 5/23293; H04N 5/772; H04N 5/765; H04N 5/775; H04N 5/781; H04N 9/68; H04N 9/8042; G06T 5/20; G01S 11/12; G03B 13/36
USPC ........................................................ 348/345
See application file for complete search history.

(56) References Cited

U.S. PATENT DOCUMENTS

| | | | | |
|---|---|---|---|---|
| 4,766,302 | A * | 8/1988 | Ishida | G02B 7/34 250/201.8 |
| 5,155,518 | A * | 10/1992 | Utagawa | G02B 7/346 396/104 |
| 5,192,860 | A * | 3/1993 | Shinohara | G02B 7/34 250/201.8 |
| 7,154,589 | B2 | 12/2006 | Mihara et al. | |
| 8,237,803 | B2 * | 8/2012 | Yumiki | G03B 7/091 348/154 |
| 2010/0066869 | A1 | 3/2010 | Nakashima | |
| 2010/0194897 | A1 * | 8/2010 | Yumiki | G03B 7/091 348/208.4 |
| 2013/0265483 | A1 * | 10/2013 | Tamaki | H04N 5/23212 348/349 |
| 2014/0204231 | A1 * | 7/2014 | Takahara | G02B 7/34 348/220.1 |
| 2014/0307134 | A1 * | 10/2014 | Kanda | H04N 5/23212 348/280 |
| 2014/0340565 | A1 * | 11/2014 | Kitani | H04N 5/23212 348/349 |
| 2014/0362279 | A1 * | 12/2014 | Takeuchi | H04N 5/23212 348/349 |
| 2015/0102442 | A1 * | 4/2015 | Ootsuka | H04N 5/23212 257/432 |
| 2015/0109518 | A1 * | 4/2015 | Ishii | H04N 5/23212 348/353 |

FOREIGN PATENT DOCUMENTS

| | | |
|---|---|---|
| JP | H01-239514 | 9/1989 |
| JP | H07-110433 | 4/1995 |
| JP | 2005-062039 | 3/2005 |
| JP | 2010-074549 | 4/2010 |
| JP | 2010-078732 | 4/2010 |
| JP | 2012-137547 | 7/2012 |
| JP | 2013-171257 | 9/2013 |
| JP | 2014-074851 | 4/2014 |
| JP | 2014-085503 | 5/2014 |

OTHER PUBLICATIONS

"International Preliminary Report on Patentability (Form PCT/IPEA/409) of PCT/JP2015/080321", dated Jun. 15, 2016, with English translation thereof, pp. 1-8.

* cited by examiner

FOCUSING CONTROL DEVICE, FOCUSING CONTROL METHOD, FOCUSING CONTROL PROGRAM, LENS DEVICE, AND IMAGING DEVICE

CROSS-REFERENCE TO RELATED APPLICATIONS

This application is a Continuation of PCT International Application No. PCT/JP2015/080321 filed on Oct. 28, 2015, which claims priority under 35 U.S.C § 119(a) to Japanese Patent Application No. 2014-233499 filed on Nov. 18, 2014. Each of the above application(s) is hereby expressly incorporated by reference, in its entirety, into the present application.

BACKGROUND OF THE INVENTION

1. Field of the Invention

The present invention relates to a focusing control device, a focusing control method, a focusing control program, a lens device, and an imaging device.

2. Description of the Related Art

In recent years, with an increase in resolution of imaging elements, such as a charge coupled device (CCD) image sensor and a complementary metal oxide semiconductor (CMOS) image sensor, there is a rapid increase in demand for electronic devices having an imaging function, such as a digital still camera, a digital video camera, and a mobile phone, such as a smartphone. The electronic devices having an imaging function described above are referred to as imaging devices.

In these imaging devices, as a focusing control method which focuses on a main subject, a contrast auto focus (AF) method or a phase difference AF method (for example, see JP2012-137547A and JP2014-85503A) is employed. Since the phase difference AF method can perform high-speed processing, the phase difference AF method is a method effective for moving image capturing where a subject is continuously imaged with an imaging element.

In the phase difference AF method, correlation calculation for calculating a correlation value while deviating signal groups according to a pair of luminous fluxes passing through different portions of a pupil area of an imaging optical system from each other is performed, and the phase difference between the two signal groups is detected based on the result of the correlation calculation.

In order to exclude the influence of offset between two signal groups, JP2012-137547A describes that differential filter processing is performed on each of the two signal groups before correlation calculation.

SUMMARY OF THE INVENTION

In a case of performing imaging with high resolution, such as 4K or 8K, since slight focus deviation becomes easily conspicuous, it is necessary to make a detection resolution of a phase difference finer than the arrangement interval of pixels as an output source of the signals in each signal group.

As described in JP2012-137547A, it is effective to perform the differential filter processing on each of the two signal group in increasing the detection resolution of the phase difference. However, the phase difference may not be detected or an incorrect phase difference may be detected according to subject conditions, such as brightness, a spatial frequency, or contrast of a main subject, or change in a subject.

If still image capturing is performed, even in such a case, a countermeasure, such as manual adjustment of the focus lens position, can be taken. However, in a case of moving image capturing, the phase difference cannot be detected or an incorrect phase difference is detected, whereby the focus lens is not stable and video with discomfort is generated.

An imaging device described in JP2014-85503A moves an imaging element so as to put phase difference detection pixels in a designated area, thereby enabling focusing intended by a user. However, even in this imaging device, there is a possibility that the phase difference cannot be detected or incorrect detection may be calculated according to subject conditions.

The present invention has been accomplished in consideration of the above-described situation, and an object of the present invention is to provide a focusing control device, a lens device, an imaging device, a focusing control method, and a focusing control program capable of securing detection accuracy of a phase difference without depending on subject conditions.

A focusing control device of the present invention comprises a plurality of first signal detection units which receive one of a pair of luminous fluxes passing through different portions arranged in one direction of a pupil area of an imaging optical system including a focus lens and detect signals according to the amount of received light, a plurality of second signal detection units which receive the other luminous flux of the pair of luminous fluxes and detect signals according to the amount of received light, a filter processing unit which performs first filter processing selected from among a plurality of kinds of filter processing on each of a first signal group output from the plurality of first signal detection units and a second signal group output from the plurality of second signal detection units, a correlation calculation unit which performs correlation calculation of the first signal group after the first filter processing by the filter processing unit and the second signal group after the first filter processing by the filter processing unit, and a lens position control unit which controls the position of the focus lens based on the result of the correlation calculation by the correlation calculation unit. The filter processing unit selects the first filter processing from among the plurality of kinds of filter processing based on subject condition information.

The present invention provides a lens device comprising the above-described focusing control device, and the above-described imaging optical system.

The present invention provides an imaging device comprising the above-described focusing control device.

A focusing control method of the present invention comprises a filter processing step of performing first filter processing selected from among a plurality of kinds of filter processing on each of a first signal group output from a plurality of first signal detection units configured to receive one of a pair of luminous fluxes passing through different portions arranged in one direction of a pupil area of an imaging optical system including a focus lens and detect signals according to the amount of received light and a second signal group output from a plurality of second signal detection units configured to receive the other luminous flux of the pair of luminous fluxes and detect signals according to the amount of received light, a correlation calculation step of performing correlation calculation of the first signal group after the first filter processing in the filter processing step and the second signal group after the first filter processing in the filter processing step, and a lens position control step of controlling the position of the focus lens based on the result of the correlation calculation in the correlation calculation step. In the filter processing step, the first filter processing is selected from among the plurality of kinds of filter processing based on subject condition information.

A focusing control program of the present invention causes a computer to execute a filter processing step of performing first filter processing selected from among a plurality of kinds of filter processing on each of a first signal group output from a plurality of first signal detection units configured to receive one of a pair of luminous fluxes passing through different portions arranged in one direction of a pupil area of an imaging optical system including a focus lens and detect signals according to the amount of received light and a second signal group output from a plurality of second signal detection units configured to receive the other luminous flux of the pair of luminous fluxes and detect signals according to the amount of received light, a correlation calculation step of performing correlation calculation of the first signal group after the first filter processing in the filter processing step and the second signal group after the first filter processing in the filter processing step, and a lens position control step of controlling the position of the focus lens based on the result of the correlation calculation in the correlation calculation step. In the filter processing step, the first filter processing is selected from among the plurality of kinds of filter processing based on subject condition information.

According to the present invention, it is possible to provide a focusing control device, an imaging device, a focusing control method, and a focusing control program capable of securing detection accuracy of a phase difference without depending on subject conditions.

DESCRIPTION OF THE PREFERRED EMBODIMENTS

Figure 1:
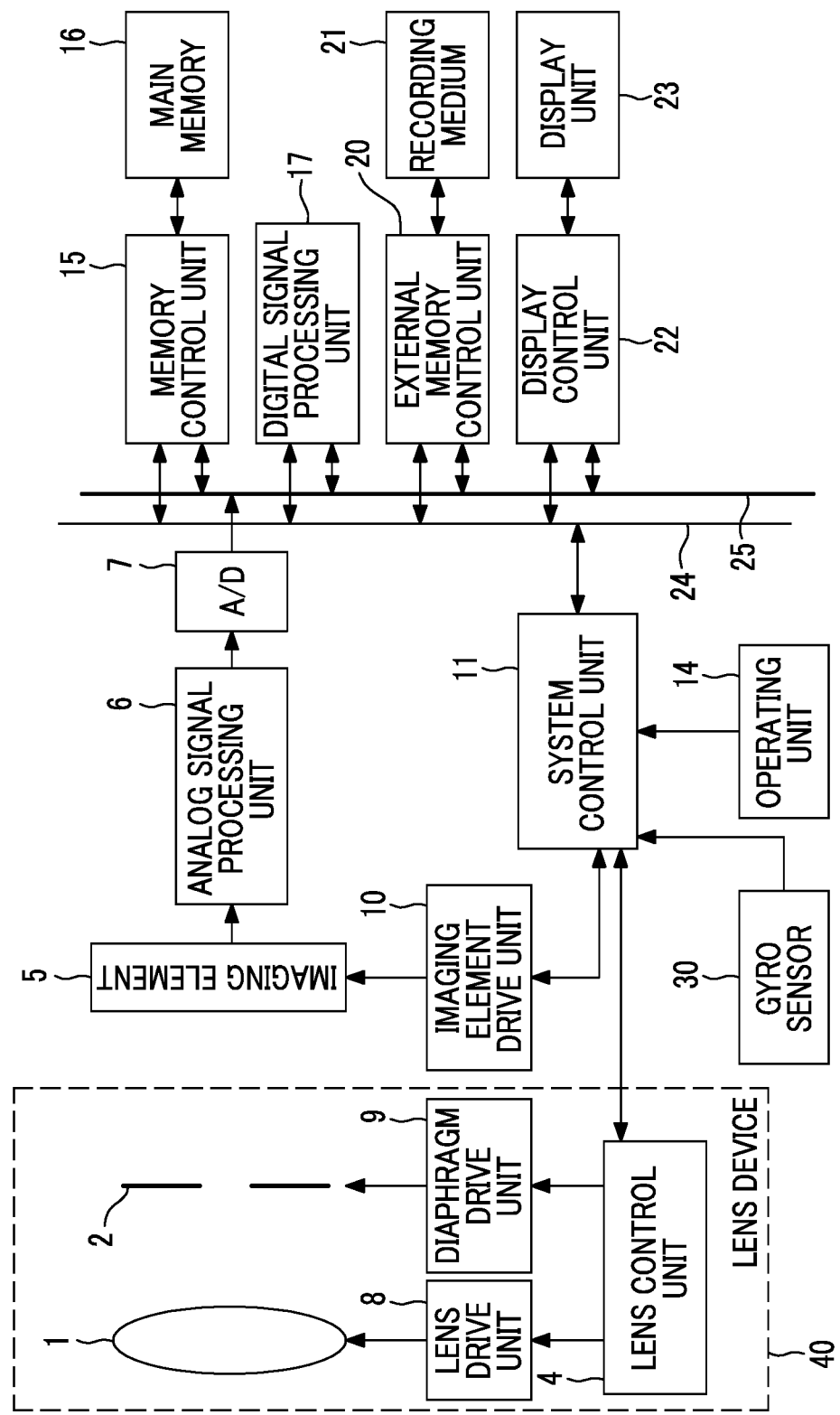
FIG. 1 is a diagram showing the schematic configuration of a digital camera as an example of an imaging device according to an embodiment of the present invention.

Hereinafter, an embodiment of the present invention will be described referring to the drawings.

FIG. 1 is a diagram showing the schematic configuration of a digital camera as an example of an imaging device according to an embodiment of the present invention.

The digital camera shown in FIG. 1 includes a lens device 40 which has an imaging lens 1 including a focus lens for focus adjustment, a zoom lens for changing a zoom magnification, and the like, a diaphragm 2, a lens control unit 4, a lens drive unit 8, and a diaphragm drive unit 9. In this embodiment, although an example where the lens device 40 is detachably mounted in a digital camera body will be described, the lens device 40 may be fixed into the digital camera body.

The imaging lens 1 and the diaphragm 2 constitute an imaging optical system, and the imaging optical system includes at least the focus lens. The focus lens is a lens for adjusting the focus of the imaging optical system, and is constituted of a single lens or a plurality of lenses. The focus lens moves in an optical axis direction of the imaging optical system, whereby focus adjustment is performed.

The lens control unit 4 of the lens device 40 is configured to communicate with a system control unit 11 in the digital camera body in a wired or wireless manner.

The lens control unit 4 drives the focus lens included in the imaging lens 1 through the lens drive unit 8 or drives the diaphragm 2 through the diaphragm drive unit 9 according to a command from the system control unit 11.

The digital camera body as an electronic device includes a gyro sensor 30 which functions as a movement detection unit configured to detect movement of the digital camera body, an imaging element 5 of a CCD type, a CMOS type, or the like which images a subject through the imaging optical system, an analog signal processing unit 6 which is connected to an output of the imaging element 5 and performs an analog signal processing, such as correlated double sampling processing, and an A/D conversion circuit 7 which converts an analog signal output from the analog signal processing unit 6 to a digital signal. The analog signal processing unit 6 and the A/D conversion circuit 7 are controlled by the system control unit 11.

The system control unit 11 which integrally controls an entire electric control system of the digital camera drives the imaging element 5 through an imaging element drive unit 10 and outputs a subject image captured through the lens device 40 as a captured image signal. An instruction signal from a user is input to the system control unit 11 through an operating unit 14.

The system control unit 11 is constituted of a processor and memories, such as a random access memory (RAM) and a read only memory (ROM). The system control unit 11 executes a focusing control program stored in the ROM, thereby implementing respective functions described below.

The electric control system of the digital camera includes a main memory 16, a memory control unit 15 connected to the main memory 16, a digital signal processing unit 17 which performs interpolation calculation, gamma correction calculation, RGB/YC conversion processing, and the like on the captured image signal output from the A/D conversion circuit 7 to generate captured image data, an external memory control unit 20 to which a detachable recording medium 21 is connected, and a display control unit 22 to which a display unit 23 mounted on a camera rear surface or the like is connected.

The memory control unit 15, the digital signal processing unit 17, the external memory control unit 20, and the display control unit 22 are connected to one another by a control bus 24 and a data bus 25, and are controlled according to commands from the system control unit 11.

Figure 2:
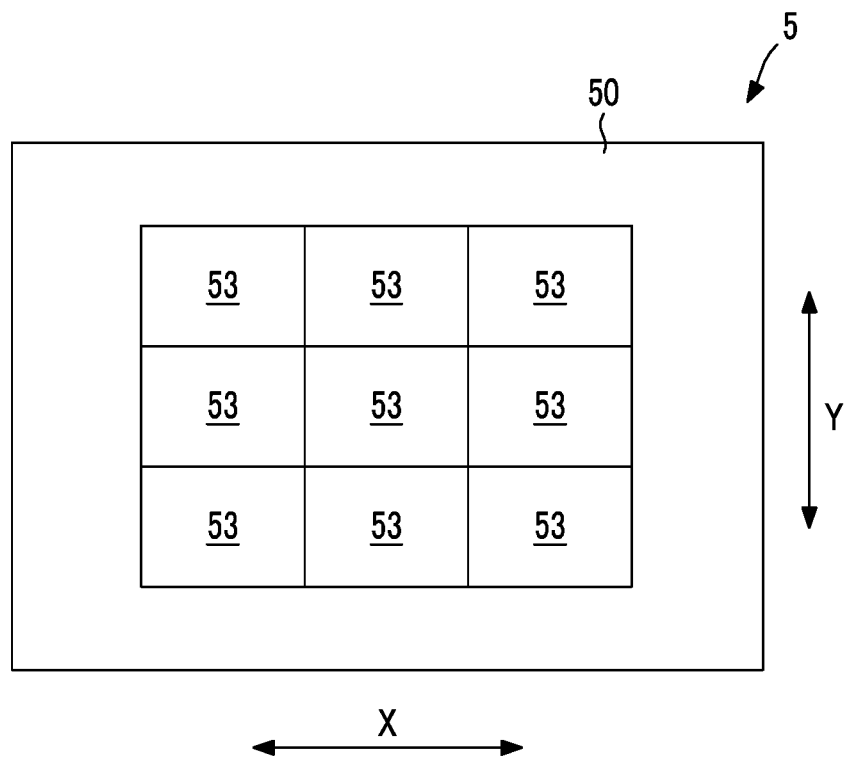
FIG. 2 is a schematic plan view showing the overall configuration of an imaging element 5 which is mounted in the digital camera shown in FIG. 1.

FIG. 2 is a schematic plan view showing the overall configuration of the imaging element 5 which is mounted in the digital camera shown in FIG. 1.

The imaging element 5 has a light receiving surface 50 where multiple pixels arranged in a two-dimensional manner of a row direction X as one direction and a column direction Y orthogonal to the row direction X are provided. In the light receiving surface 50, AF areas 53 to be an area to be focused, in the example of FIG. 2, nine, are provided.

Each AF area 53 is an area which includes imaging pixels and phase difference detection pixels as pixels.

In a portion of the light receiving surface 50 excluding the AF areas 53, only the imaging pixels are provided. The AF areas 53 may be provided with no gap therebetween in the light receiving surface 50.

Figure 3:
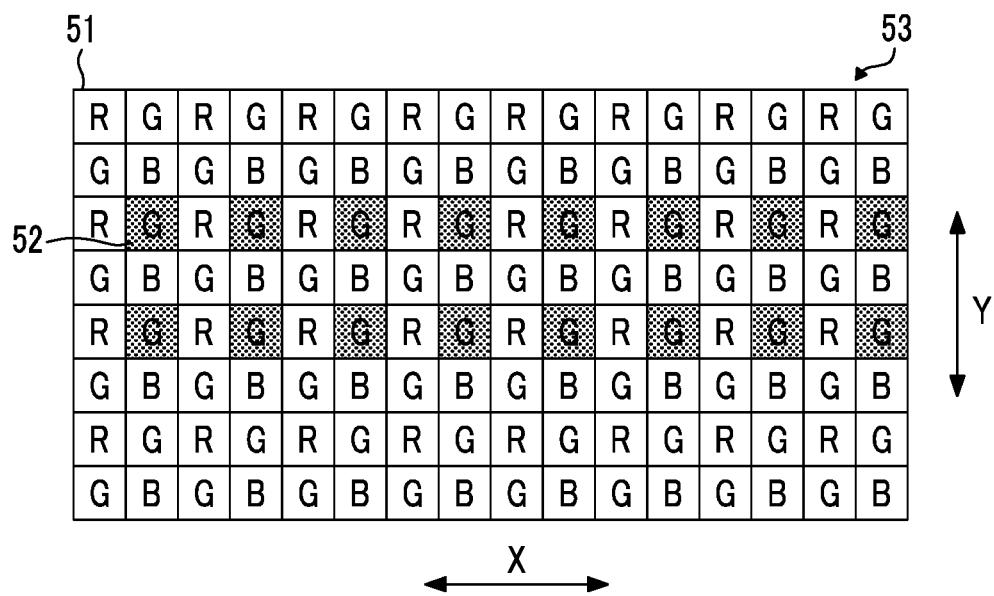
FIG. 3 is a partial enlarged view of one AF area 53 shown in FIG. 2.

FIG. 3 is a partial enlarged view of one AF area 53 shown in FIG. 2.

In each AF area 53, pixels 51 are arranged in a two-dimensional manner. Each pixel 51 includes a photoelectric conversion unit, such as a photodiode, and a color filter formed above the photoelectric conversion unit.

In FIG. 3, a pixel 51 (referred to as R pixel 51) which includes a color filter (R filter) for transmitting red light is marked with a character "R", a pixel 51 (referred to as G pixel 51) which includes a color filter (G filter) for transmitting green light is marked with a character "G", and a pixel 51 (referred to as B pixel 51) which includes a color filter (B filter) for transmitting blue light is marked with a character "B". The array of the color filters is a Bayer array over the entire light receiving surface 50.

In each AF area 53, a part of (shaded pixels 51 in FIG. 3) of the G pixels 51 becomes the phase difference detection pixels 52. In the example of FIG. 3, each G pixel 51 and the G pixel 51 having the same color closest to each G pixel 51 in the column direction Y in an arbitrary pixel row among pixel rows including the R pixels 51 and the G pixels 51 become the phase difference detection pixels 52.

Figure 4:
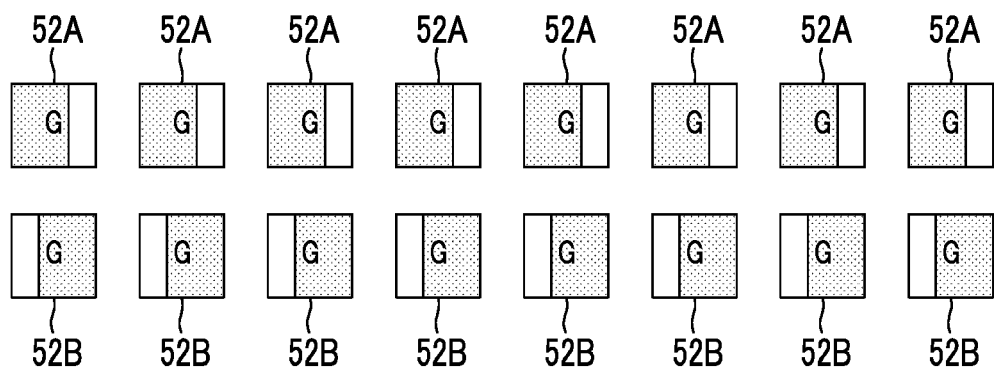
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 include two pixels of a phase difference detection pixel 52A and a phase difference detection pixel 52B.

The phase difference detection pixel 52A is a first signal detection unit which receives one of a pair of luminous fluxes passing through two different portions arranged in the row direction X of a pupil area of the imaging lens 1 and detects a signal according to the amount of received light.

The phase difference detection pixel 52B is a second signal detection unit which receives the other luminous flux of the pair of luminous fluxes and detects a signal according to the amount of received light.

A plurality of pixels 51 other than the phase difference detection pixels 52A and 52B in each AF area 53 are imaging pixels, and the imaging pixels receive the pair of luminous fluxes passing through the imaging lens 1 and detect signals according to the amount of received light.

A light shielding film is provided above the photoelectric conversion unit of each pixel 51, and an opening which defines a light receiving area of the photoelectric conversion unit is formed in the light shielding film.

The center of the opening of the imaging pixel 51 coincides with the center of the photoelectric conversion unit of the imaging pixel 51. In contrast, the center of the opening (a white portion of FIG. 4) of the phase difference detection pixel 52A is eccentric to the right with respect to the center of the photoelectric conversion unit of the phase difference detection pixel 52A.

The center of the opening (a white portion of FIG. 4) of the phase difference detection pixel 52B is eccentric to the left with respect to the center of the photoelectric conversion unit of the phase difference detection pixel 52B. The right direction used herein is one direction of the row direction X shown in FIG. 3, and the left direction is another direction of the row direction X.

Figure 5:
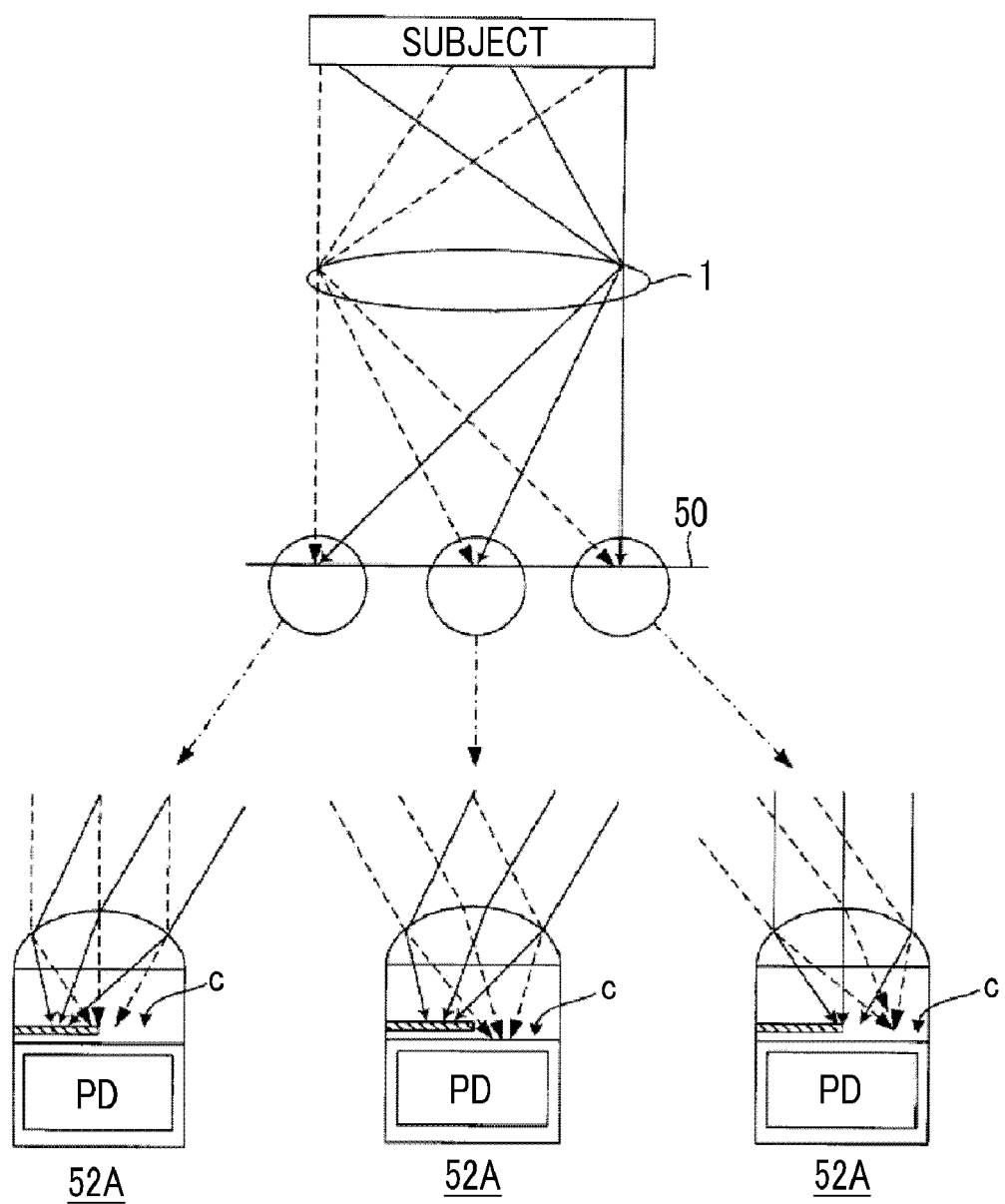
FIG. 5 is a diagram showing the sectional configuration of a phase difference detection pixel 52A.

FIG. 5 is a diagram showing the sectional configuration of the phase difference detection pixel 52A. As shown in FIG. 5, an opening c of the phase difference detection pixel 52A is eccentric to the right with respect to the photoelectric conversion unit (PD). As shown in FIG. 5, one side of the photoelectric conversion unit is covered with the light shielding film, whereby light incident from a direction opposite to a direction of being covered with the light shielding film can be selectively shielded.

With this configuration, using a pixel group having the phase difference detection pixels 52A in an arbitrary row and a pixel group having the phase difference detection pixels 52B at the same distance in the column direction Y with respect to the respective phase difference detection pixels 52A in the pixel group, it is possible to detect the phase difference in the row direction X in images captured by the respective two pixel groups.

The imaging element 5 may have a configuration in which there are a plurality of pairs of first signal detection units configured to receive one of a pair of luminous fluxes passing through different portions in the row direction X of the pupil area of the imaging lens 1 and detect signals according to the amount of received light and second signal detection units configured to receive the other luminous flux of the pair of luminous fluxes and detect signals according to the amount of received light, and is not limited to the configuration shown in FIGS. 2 to 5.

For example, a configuration may be made in which all pixels included in the imaging element 5 are set as the imaging pixels 51, each imaging pixel 51 is divided into two areas, one divided area is set as the phase difference detection pixel 52A, and the other divided area is set as the phase difference detection pixel 52B.

Figure 6:
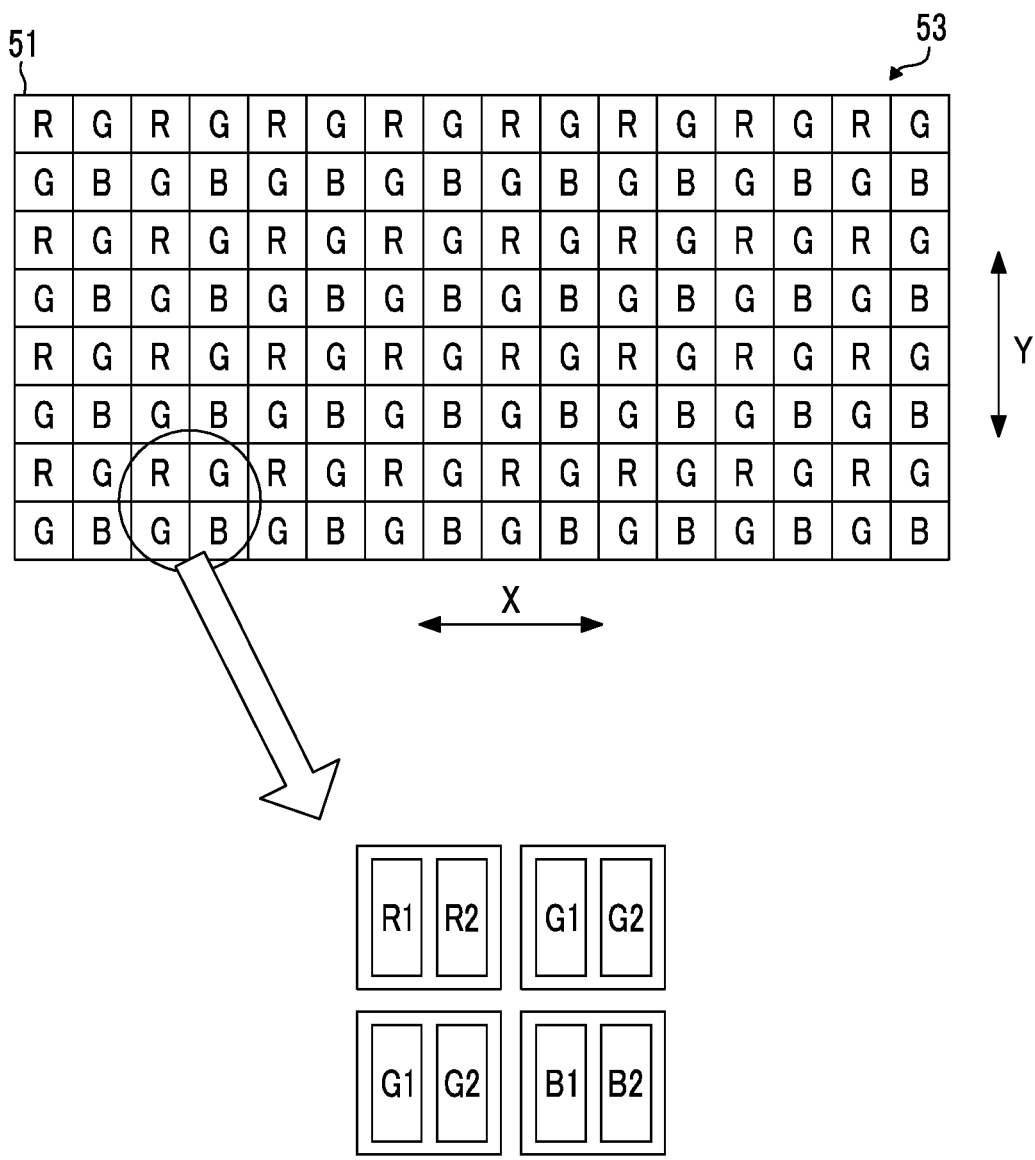
FIG. 6 is a diagram showing a configuration in which all pixels included in the imaging element 5 are set as imaging pixels 51 and each imaging pixel 51 is divided into two areas.

FIG. 6 is a diagram showing a configuration in which all pixels included in the imaging element 5 are set as the imaging pixels 51 and each imaging pixel 51 is divided into two areas.

In the configuration of FIG. 6, each imaging pixel 51 marked with R in the imaging element 5 is divided into two areas, and the two divided areas are respectively set as a phase difference detection pixel R1 and a phase difference detection pixel R2.

Each imaging pixel 51 marked with G in the imaging element 5 is divided into two areas, and the two divided areas are respectively set as a phase difference detection pixel G1 and a phase difference detection pixel G2.

Each imaging pixel 51 marked with B in the imaging element 5 is divided into two areas, the two divided areas are respectively set as a phase difference detection pixel B1 and a phase difference detection pixel B2.

In this configuration, the phase difference detection pixels R1, G1, and B1 respectively become the first signal detection units, and the phase difference detection pixels R2, G2, and B2 respectively become the second signal detection units.

The signals can be independently read from the first signal detection units and the second signal detection units. If the signals of the first signal detection units and the second signal detection units are added, a normal imaging signal with no phase difference is obtained.

That is, in the configuration of FIG. 6, all pixels are used as both of the phase difference detection pixels and the imaging pixels.

Figure 7:
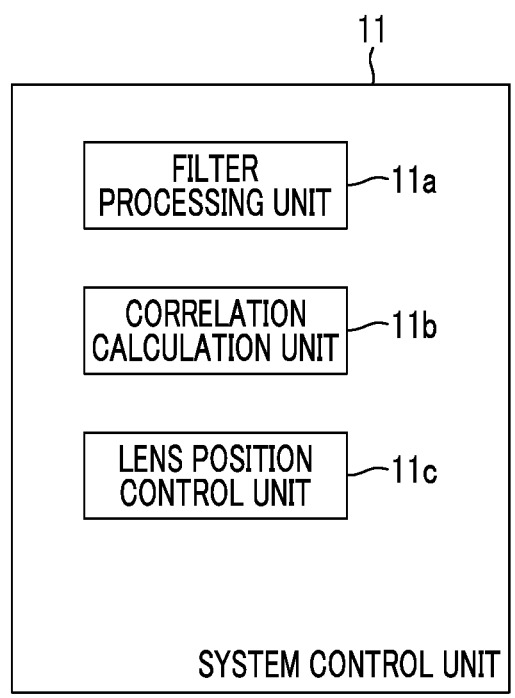
FIG. 7 is a diagram showing functional blocks which are formed by a focusing control program being executed by a system control unit 11 shown in FIG. 2.

FIG. 7 is a diagram showing functional blocks which are formed by a focusing control program being executed by the system control unit 11 shown in FIG. 2. The system control unit 11 executes the focusing control program stored in the ROM, thereby functioning as a filter processing unit 11a, a correlation calculation unit 11b, and a lens position control unit 11c.

The filter processing unit 11a performs one kind of filter processing (first filter processing) selected from among a plurality of kinds of (in this case, two) filter processing on each of a first signal group output from a plurality of phase difference detection pixels 52A in one AF area 53 selected from among the nine AF areas 53 by a user's operation or the like and a second signal group output from the phase difference detection pixels 52B paired with the phase difference detection pixels 52A.

A plurality of kinds of filter processing includes differential filter processing and integral filter processing.

The differential filter processing is so-called high-pass filter processing (high-frequency range enhancement processing). For example, the differential filter processing refers to processing for, if three filter coefficients of a, b, and c are provided and a=1, b=0, and c=−1, substituting an arbitrary signal among signals constituting a signal group with an integrated value of a value obtained by multiplying the arbitrary signal by the coefficient b, a value obtained by multiplying a signal on the left side of the arbitrary signal by the coefficient a, and a value obtained by multiplying a signal on the right side of the arbitrary signal by the coefficient c. The number of filter coefficients and the numerical values of the filter coefficients are set to appropriate values.

The integral filter processing is so-called low-pass filter processing (low-frequency range enhancement processing). For example, the integral filter processing refers to processing for, if three filter coefficients of A, B, and C are provided and A=1, B=1, and C=1, substituting an arbitrary signal among signals constituting a signal group with an average value of a value obtained by multiplying the arbitrary signal by the coefficient B, a value obtained by multiplying a signal on the left side of the arbitrary signal by the coefficient A, and a value obtained by multiplying a signal on the right side of the arbitrary signal by the coefficient C. The number of filter coefficients and the numerical values of the filter coefficients are set to appropriate values.

The filter processing unit 11a selects one kind of filter processing from among a plurality of kinds of filter processing based on subject condition information which is information indicating subject conditions as conditions relating to a subject captured by the selected AF area 53.

The subject conditions include at least one of the contrast of the subject, the brightness of the subject, the spatial frequency of the subject, and the movement amount of the subject.

The correlation calculation unit 11b performs correlation calculation of the first signal group after the filter processing by the filter processing unit 11a and the second signal group after the filter processing by the filter processing unit 11a, and detects a phase difference as a deviation amount between the first signal group and the second signal group in the row direction X based on the result of the correlation calculation.

Specifically, The correlation calculation refers to processing for setting data of the first signal group output from a plurality of phase difference detection pixels 52A as A[1], . . . , and A[k], setting data of the second signal group output from the phase difference detection pixels 52B paired with the phase difference detection pixels 52A as B[1], . . . , and B[k], and calculating a correlation value of two pieces of data when the two pieces of data are deviated by "d" in the row direction X.

The correlation value can be calculated by an area S[d] surrounded by two data waveforms calculated by the following expression. The smaller the correlation value, the higher the degree of coincidence of two pieces of data.

$$S[d] = \sum_{n=1}^{k} (A[n+d] - B[n])^2 \quad (1)$$

$$d = -L, \ldots, -2, -1, 0, 1, 2, \ldots, L$$

A graph indicating change in the correlation value when the deviation amount d between two pieces of data is set on the horizontal axis and the area S[d] as the correlation value of two pieces of data is set on the vertical axis is referred to as a correlation curve, and the correlation curve becomes a result of correlation calculation.

Since at least one trough portion (a portion where the correlation value becomes minimum) is included in the correlation curve, the deviation amount d corresponding to any one trough portion included in the correlation curve is detected as the phase difference between the first signal group and the second signal group in the row direction X.

The lens position control unit 11c sends a command to the lens drive unit 8 through the lens control unit 4 and makes the lens drive unit 8 drive the focus lens according to a drive amount corresponding to the phase difference detected by the correlation calculation unit 11b, thereby controlling the position of the focus lens.

Information indicating the correspondence relationship between the phase difference and the drive amount of the focus lens is determined in advance at the time of manufacturing a digital camera, and is stored in the ROM of the system control unit 11.

The lens position control unit 11c reads the drive amount corresponding to the phase difference from the ROM and transmits the read drive amount to the lens drive unit 8. The lens drive unit 8 moves the focus lens by the transmitted drive amount.

Figure 8:
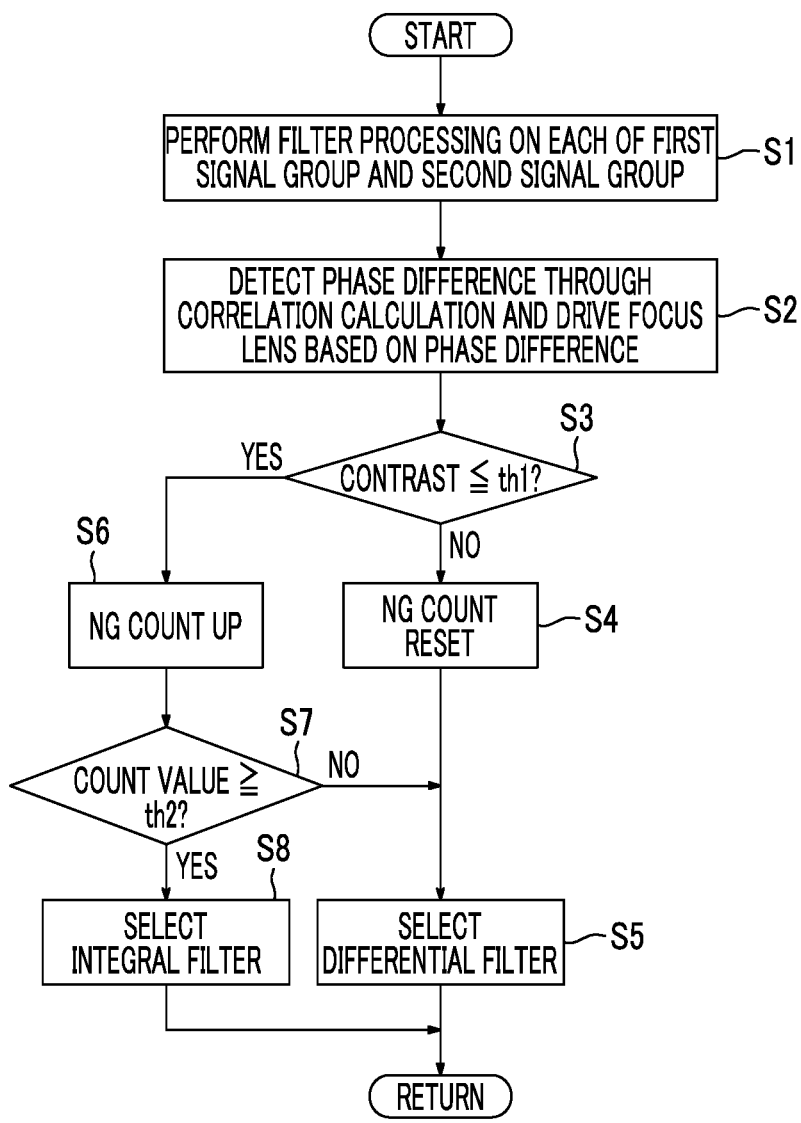
FIG. 8 is a flowchart illustrating an AF operation by the system control unit 11 at the time of moving image capturing.

FIG. 8 is a flowchart illustrating an AF operation by the system control unit 11 at the time of moving image capturing. FIG. 8 shows an AF operation in a case where the subject condition information is the contrast of the subject.

If moving image capturing is started, the filter processing unit 11*a* performs the filter processing on each of the first signal group output from a plurality of phase difference detection pixels 52A in one AF area 53 selected from among the nine AF areas 53 by a user's operation or the like and the second signal group output from the phase difference detection pixels 52B paired with the phase difference detection pixels 52A. At the time of the start of moving image capturing, the differential filter processing is selected as the filter processing.

Next, the correlation calculation unit 11*b* performs the correlation calculation of the first signal group and the second signal group after the filter processing by the filter processing unit 11*a*, and detects the phase difference based on the result of the correlation calculation. Then, the lens position control unit 11*c* controls the position of the focus lens based on the phase difference (Step S2).

Next, the filter processing unit 11*a* determines the magnitude of the contrast of the subject imaged through the imaging optical system based on the result of the correlation calculation in Step S2 (Step S3).

Figure 9:
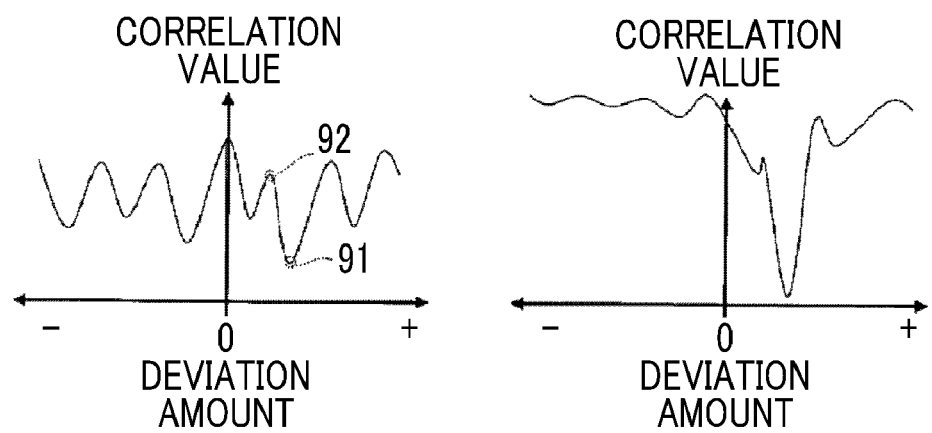
FIG. 9 is a diagram showing an example of a correlation curve.

In a case where the contrast of the subject is low, a correlation curve as the result of the correlation calculation has a shape in which crest portions and trough portions are alternately arranged as shown in the left view of FIG. 9, and the difference in the correlation value between the trough portions decreases.

The filter processing unit 11*a* calculates the difference between a minimum value 91 of the correlation value in the correlation curve and a correlation value 92 constituting the crest portion closest to the minimum value 91.

The filter processing unit 11*a* determines that the contrast of the subject is equal to or less than a first threshold value th1 if the difference is equal to or less than a value determined in advance, and determines that the contrast of the subject exceeds the first threshold value th1 if the difference exceeds the value determined in advance.

The first threshold value th1 may be set to a value such that the level of contrast can be determined from the results of the correlation calculation obtained by imaging a plurality of subjects having known contrast with the imaging element 5.

If the determination of Step S3 is NO, the filter processing unit 11*a* resets a count value of a NG counter to 0 (Step S4).

After Step S4, the filter processing unit 11*a* selects differential filter processing as filter processing to be performed on a first signal group and a second signal group next output from the imaging element 5 (Step S5), and returns the process to Step S1.

If the determination of Step S3 is YES, the filter processing unit 11*a* counts up the count value of the NG counter by one (Step S6).

After Step S6, the filter processing unit 11*a* determines whether or not the count value of the NG counter becomes equal to or greater than a second threshold value th2 (Step S7). The second threshold value th2 is appropriately set to a natural number equal to or greater than 2.

If the determination of Step S7 is NO, the filter processing unit 11*a* performs the processing of Step S5.

If the determination of Step S7 is YES, the filter processing unit 11*a* selects integral filter processing as filter processing to be performed on a first signal group and a second signal group next output from the imaging element 5 (Step S8), and returns the process to Step S1.

With the above operation, in a case where a state of the contrast of the subject imaged with the selected AF area 53 being equal to or less than the first threshold value th1 is continued with a frequency equal to or greater than the second threshold value th2, an integral filter is selected.

In a state where the contrast becomes equal to or less than the first threshold value th1, as shown in the left view of FIG. 9, the difference in the correlation value between the trough portions decreases, and a correlation value corresponding to a true phase difference is hardly specified.

If the integral filter is selected, at the next phase difference detection timing, each of the first signal group and the second signal group is enhanced in a low-frequency range. As a result, the correlation curve changes from a state shown on the left side of FIG. 9 to a state shown on the right side of FIG. 9.

Accordingly, the minimum value of the correlation value is easily specified uniquely, and phase difference detection accuracy can be improved.

If the contrast of the subject exceeds the first threshold value th1, a differential filter is selected. For this reason, it is possible to increase the detection resolution of the phase difference to perform high-accuracy phase difference AF under subject conditions that a phase difference is easily detected.

In the example of FIG. 8, the phase difference is detected at an arbitrary timing, the drive of the focus lens is started based on the detected phase difference, and then, filter processing is selected based on a correlation curve used when the phase difference is calculated.

However, correlation calculation may be performed at an arbitrary timing, filter processing may be selected based on the result of the correlation calculation, then, correlation calculation may be performed again, and the focus lens may be driven based on the result of the second correlation calculation.

In FIG. 8, a configuration may be made in which Steps S4, S6, and S7 are omitted, when the determination of Step S3 is YES, Step S8 is performed, and when the determination of Step S3 is NO, Step S5 is performed.

In this configuration, while the detection resolution of the phase difference is frequently switched depending on the contrast of the subject, according to the example of FIG. 8, since frequent switching does not occur, it is possible to stabilize the phase difference AF operation.

Figure 10:
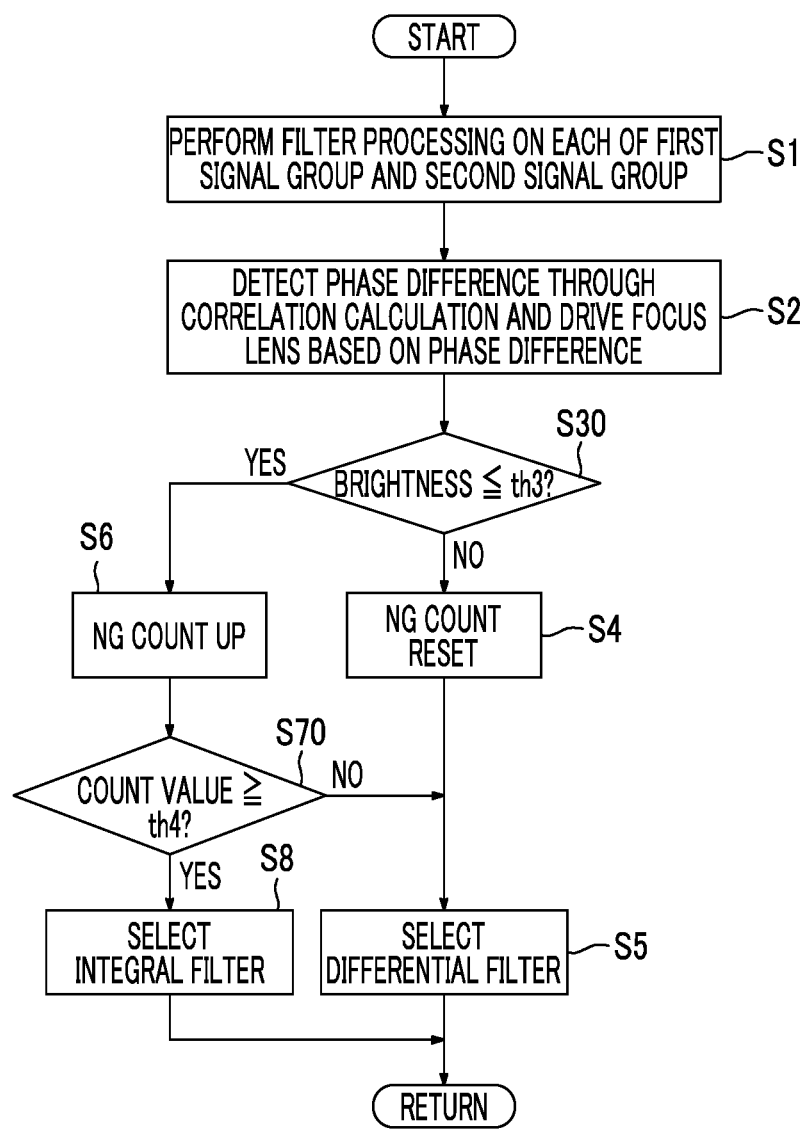
FIG. 10 is a flowchart illustrating an AF operation by the system control unit 11 at the time of moving image capturing.

FIG. 10 is a flowchart illustrating an AF operation by the system control unit 11 at the time of moving image capturing. FIG. 10 shows an AF operation in a case where the subject condition information is the brightness of the subject. In FIG. 10, the same processing as those of FIG. 8 are represented by the same reference numerals, and description thereof will not be repeated.

In the flowchart shown in FIG. 10, Step S3 of FIG. 8 is changed to Step S30, and Step S7 of FIG. 8 is changed to Step S70.

In Step S30, the filter processing unit 11*a* calculated an integrated value of signals output all pixels of the selected AF area 53 and calculates the integrated value as the brightness of the subject imaged with the AF area 53.

If the calculated brightness is equal to or less than a third threshold value th3, the filter processing unit 11*a* counts up the count value of the NG counter in Step S6 and performs processing of Step S70, and if the calculated brightness exceeds the third threshold value th3, the filter processing unit 11a resets the NG counter in Step S4 and performs the processing of Step S5.

In Step S70, the filter processing unit 11a determines whether or not the count value of the NG counter becomes equal to or greater than a fourth threshold value th4. The fourth threshold value th4 is appropriately set to a natural number equal to or greater than 2.

The filter processing unit 11a performs the processing of Step S5 if the determination of Step S70 is NO, and performs the processing of Step S8 if the determination of Step S70 is YES.

In a case where the brightness of the subject is low, since the ratio of noise occupying the signals increases, the detection accuracy of the phase difference is likely to be affected by noise.

Accordingly, as shown in FIG. 10, in a case where a state of the brightness of the subject being equal to or less than the third threshold value th3 is continued with a frequency equal to or greater than the fourth threshold value th4, the integral filter is selected, whereby it is possible to perform correlation calculation in a state where a noise component is reduced, and to prevent degradation of the detection accuracy of the phase difference.

In a case where the brightness of the subject is low, an image captured by the imaging element 5 and displayed on the display unit 23 is dark, and even if the detection resolution of the phase difference becomes low, a possibility that an observer of the image feels a sense of discomfort is reduced. For this reason, switching to the integral filter less affects degradation of the detection resolution of the phase difference.

If the brightness of the subject exceeds the third threshold value th3, the differential filter is selected. For this reason, it is possible to increase the detection resolution of the phase difference to perform high-accuracy phase difference AF under subject conditions that the phase difference is easily detected.

In the example of FIG. 10, the phase difference is detected at an arbitrary timing, the drive of the focus lens is started based on the detected phase difference, and then, filter processing is selected based on a correlation curve used when the phase difference is calculated.

However, correlation calculation may be performed at an arbitrary timing, filter processing may be selected based on the result of the correlation calculation, then, correlation calculation may be performed again, and the focus lens may be driven based on the result of the second correlation calculation.

In FIG. 10, a configuration may be made in which Steps S4, S70, and S6 are omitted, when the determination of Step S30 is YES, Step S8 is performed, and when the determination of Step S30 is NO, Step S5 is performed.

Figure 11:
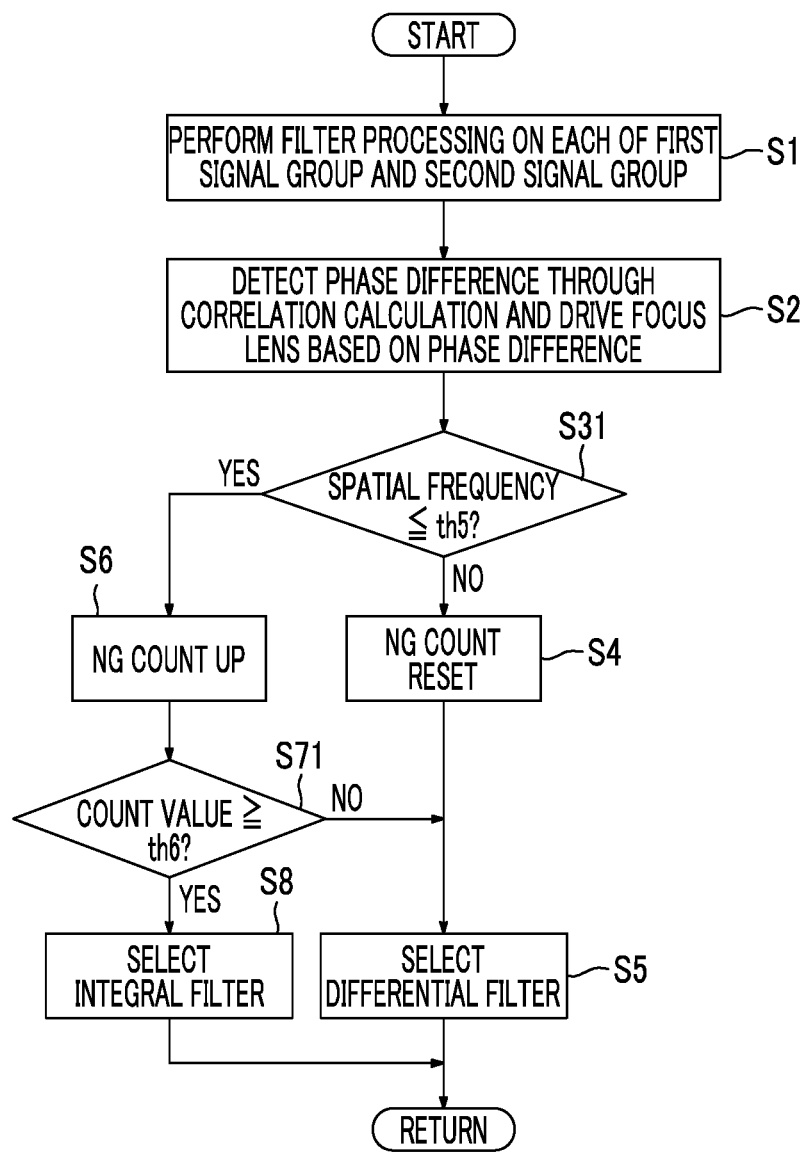
FIG. 11 is a flowchart illustrating an AF operation by the system control unit 11 at the time of moving image capturing.

FIG. 11 is a flowchart illustrating an AF operation by the system control unit 11 at the time of moving image capturing. FIG. 11 shows an AF operation in a case where the subject condition information is the spatial frequency of the subject. In FIG. 11, the same processing as those of FIG. 8 are represented by the same reference numerals, and description thereof will not be repeated.

In the flowchart shown in FIG. 11, Step S3 of FIG. 8 is changed to Step S31, and Step S7 of FIG. 8 is changed to Step S71.

In Step S31, the filter processing unit 11a determines whether or not the spatial frequency of the subject is equal to or greater than a fifth threshold value th5 based on the result of the correlation calculation of Step S2.

Figure 12:
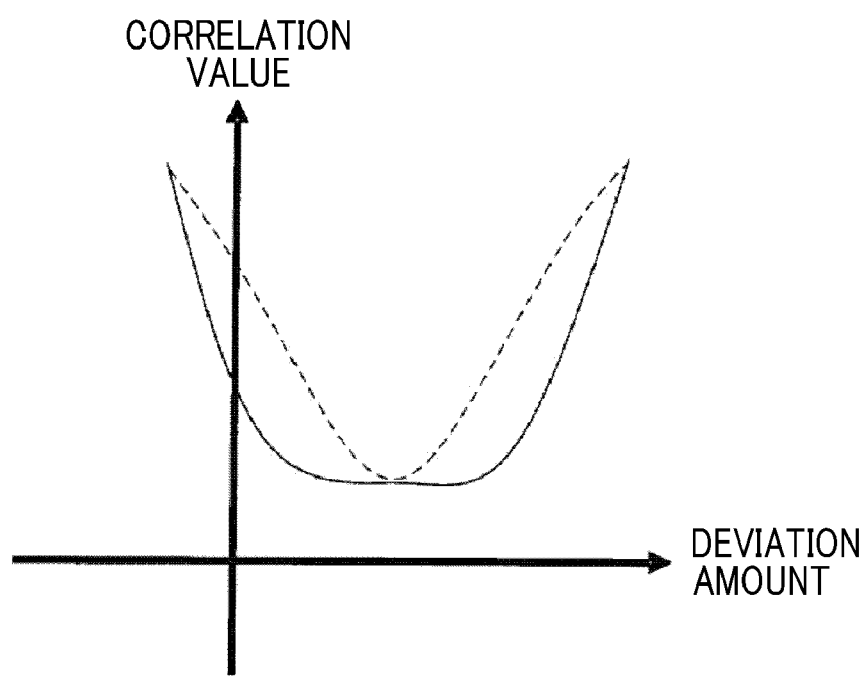
FIG. 12 is a diagram showing an example of a correlation curve for a high-frequency subject.

In a case where the spatial frequency of the subject is high, it is understood that a correlation curve has a downward convex shape and a shape with a flat bottom portion as shown by a solid-line waveform of FIG. 12.

In a case where the spatial frequency of the subject is low, a correlation curve has a downward convex shape and a shape with a sharp-pointed bottom portion as shown by a broken-line waveform of FIG. 12.

Accordingly, it is possible to determine the magnitude of the spatial frequency of the subject according to the sharpness of the bottom portion of the correlation curve.

The sharpness of the bottom portion of the correlation curve can be calculated by, for example, a variance value of the minimum value corresponding to a deviation amount in a predetermined range centering on a deviation amount corresponding to the minimum value of the correlation value.

Alternatively, a threshold value is set to the correlation value, and the sharpness of the bottom portion of the correlation curve can be calculated by a variation value of each correlation value of a portion in correlation curve where the correlation value becomes equal to or less than the threshold value.

For the method of determining the spatial frequency of the subject, other known methods may be used. For example, the spatial frequency may be calculated based on a captured image signal captured by all pixels of the AF area 53.

If the determination of Step S31 is YES, the filter processing unit 11a counts up the count value of the NG counter in Step S6 and performs processing of Step S71, and if the determination of Step S31 is NO, the filter processing unit 11a resets the NG counter in Step S4 and performs the processing of Step S5.

In Step S71, the filter processing unit 11a determines whether or not the count value of the NG counter becomes equal to or greater than a sixth threshold value th6. The sixth threshold value th6 is appropriately set to a natural number equal to or greater than 2.

The filter processing unit 11a performs the processing of Step S5 if the determination of Step S71 is NO, and performs the processing of Step S8 if the determination of Step S71 is YES.

In a case where the spatial frequency of the subject is high, since a correlation curve becomes as shown in FIG. 12, a possibility that the phase difference is erroneously detected increases.

Accordingly, as shown in FIG. 11, in a case where a state of the spatial frequency of the subject being equal to or less than the fifth threshold value th5 is continued with a frequency equal to or greater than the sixth threshold value th6, the integral filter is selected, whereby it is possible to perform correlation calculation in a state where a high-frequency component of the subject is attenuated, to bring the correlation curve close to a state of a broken line of FIG. 12, and to prevent degradation of the detection accuracy of the phase difference.

In a case where the spatial frequency of the subject is high, if a state where the differential filter is selected is brought, the phase difference is changed by moving the digital camera even just a little, and the operation of the focus lens is not stable.

In a case where the spatial frequency of the subject is high, the integral filter is selected, whereby it is possible to prevent the focus lens from moving relative to slight movement of the digital camera, and to stabilize the phase difference AF operation.

In the example of FIG. 11, the phase difference is detected at an arbitrary timing, the drive of the focus lens is started based on the detected phase difference, and then, filter processing is selected based on a correlation curve used when the phase difference is calculated.

However, correlation calculation may be performed at an arbitrary timing, filter processing may be selected based on the result of the correlation calculation, then, correlation calculation may be performed again, and the focus lens may be driven based on the result of the second correlation calculation.

In FIG. 11, a configuration may be made in which Steps S4, S71, and S6 are omitted, when the determination of Step S31 is YES, Step S8 is performed, and when the determination of Step S31 is NO, Step S5 is performed.

Figure 13:
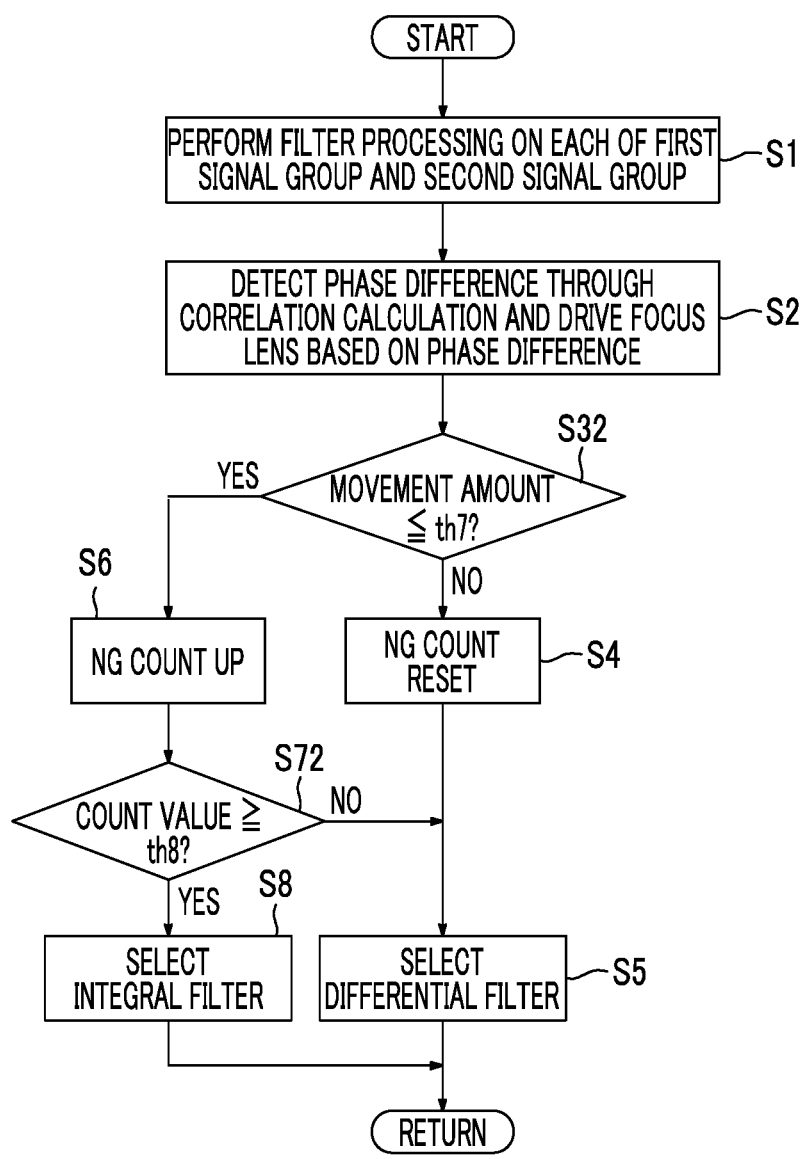
FIG. 13 is a flowchart illustrating an AF operation by the system control unit 11 at the time of moving image capturing.

FIG. 13 is a flowchart illustrating an AF operation by the system control unit 11 at the time of moving image capturing. FIG. 13 shows an AF operation in a case where the subject condition information is the movement amount of the subject. In FIG. 13, the same processing as those of FIG. 8 are represented by the same reference numerals, and description thereof will not be repeated.

In the flowchart shown in FIG. 13, Step S3 of FIG. 8 is changed to Step S32, and Step S7 of FIG. 8 is changed to Step S72.

In Step S32, the filter processing unit 11a determines whether or not the movement amount of the subject imaged with the selected AF area 53 relative to the imaging element 5 is equal to or greater than a seventh threshold value th7 based on a detection signal of the gyro sensor 30.

In a case where the digital camera is panned, the movement amount of the subject imaged with the selected AF area 53 relative to the imaging element 5 changes largely.

Accordingly, it is possible to determine whether or not the digital camera is panned according to the magnitude of the movement amount determined based on the detection signal of the gyro sensor 30.

If the determination of Step S32 is YES, the filter processing unit 11a counts up the count value of the NG counter in Step S6 and performs processing of Step S72, if the determination of Step S32 is NO, the filter processing unit 11a resets the NG counter in Step S4 and performs the processing of Step S5.

In Step S72, the filter processing unit 11a determines whether or not the count value of the NG counter becomes equal to or greater than an eighth threshold value th8. The eighth threshold value th8 is appropriately set to a natural number equal to or greater than 2.

The filter processing unit 11a performs the processing of Step S5 if the determination of Step S72 is NO, and performs the processing of Step S8 if the determination of Step S72 is YES.

If a state where the digital camera is panned and the subject changes is continued, there is a high possibility that the phase difference is changed largely, and there is a high possibility that the position of the focus lens is frequently switched.

For this reason, in a case where this state is continued, the integral filter is selected, and the detection resolution of the phase difference is lower than when the differential filter is selected, whereby it is possible to prevent the focus lens from being frequently switched.

In the example of FIG. 13, the phase difference is detected at an arbitrary timing, the drive of the focus lens is started based on the detected phase difference, and then, filter processing is selected based on a correlation curve used when the phase difference is calculated.

However, correlation calculation may be performed at an arbitrary timing, filter processing may be selected based on the result of the correlation calculation, then, correlation calculation may be performed again, and the focus lens may be driven based on the result of the second correlation calculation.

In FIG. 13, a configuration may be made in which Steps S4, S72, and S6 are omitted, when the determination of Step S32 is YES, Step S8 is performed, and when the determination of Step S32 is NO, Step S5 is performed.

Until now, although one kind of integral filter processing is selected in Step S8, a configuration may be made in which a plurality of kinds of integral filter processing are prepared, and the filter processing unit 11a selects integral filter processing in which the larger the magnitude of the count value, the more the degree of enhancement of a low-frequency range count value is enhanced (for example, the number of filter coefficients increases).

The integral filter processing may be processing including at least integral filter processing, and may be, for example, filter processing in which differential filter processing and integral filter processing are multiplied.

Until now, although the differential filter processing and the integral filter processing are switched, the present invention is not limited thereto.

For example, a configuration may be made in which a plurality of kinds of differential filter processing are prepared as filter processing, differential filter processing in which the degree of enhancement of a high-frequency range becomes maximum is selected in Step S5, and filter processing in which the degree of enhancement of the high-frequency range is smaller than the filter processing selected in Step S5 is selected in Step S8.

In this case, the kind of filter processing may be changed according to the count value. Even with this configuration, it is possible to improve the detection accuracy of the phase difference under subject conditions that the phase difference is hardly detected.

In the digital camera described above, the system control unit 11 functions as a focusing control device. Although a digital camera has been exemplified until now, the present invention can be applied in, for example, a camera system for broadcasting.

Figure 14:
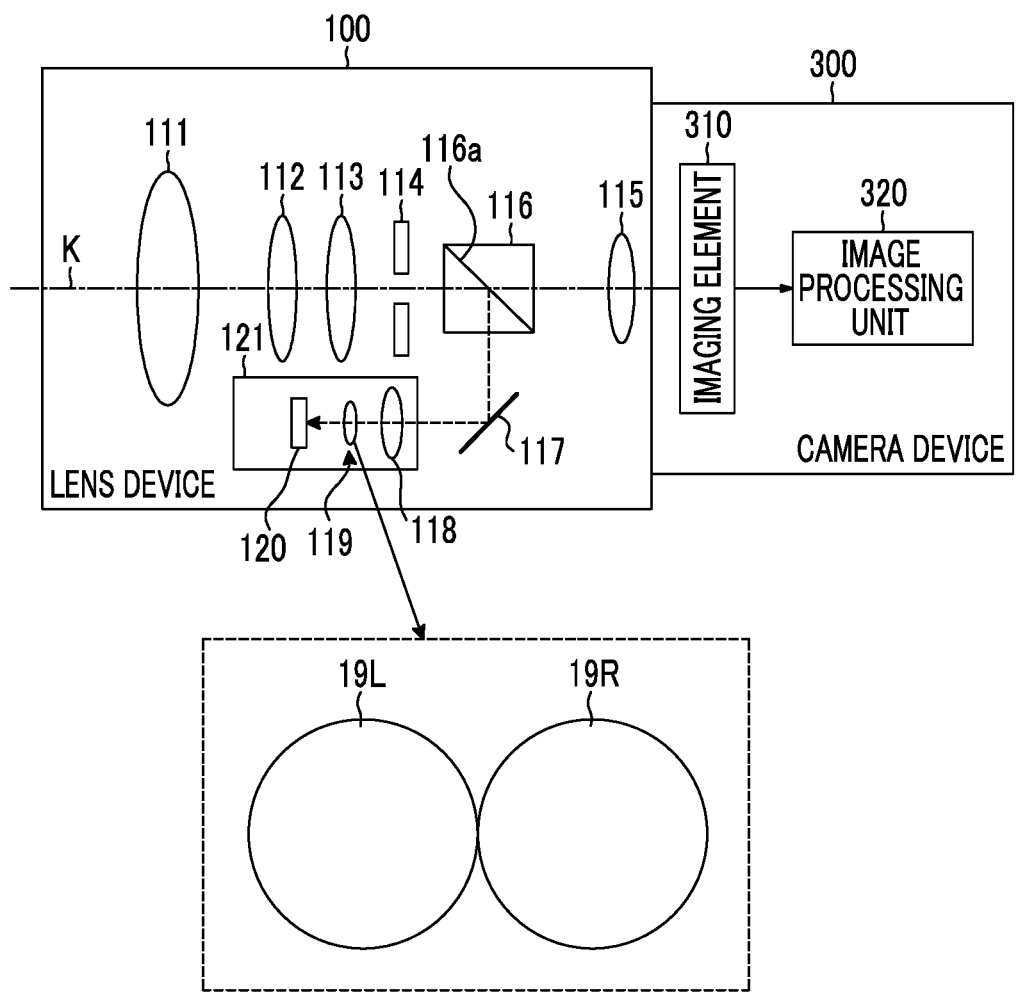
FIG. 14 is a diagram showing the schematic configuration of a camera system according to an embodiment of the present invention.

FIG. 14 is a diagram showing the schematic configuration of a camera system according to an embodiment of the present invention. The camera system is suitable for a camera system for business use, such as broadcasting or movie.

The camera system shown in FIG. 14 includes a lens device 100, and a camera device 300 as an imaging device in which the lens device 100 is mounted.

The lens device 100 includes a focus lens 111, zoom lenses 112 and 113, a diaphragm 114, and a master lens group 115, and these are arranged in this order from a subject side.

The focus lens 111, the zoom lenses 112 and 113, the diaphragm 114, and the master lens group 115 constitute an imaging optical system. The imaging optical system includes at least the focus lens 111.

The lens device 100 further includes a beam splitter 116 including a reflective surface 116a, a mirror 117, and an AF unit 121 including a condenser lens 118, a separator lens 119, and an imaging element 120. The imaging element 120 is an image sensor, such as a CCD image sensor or a CMOS image sensor, having a plurality of pixels arranged in a two-dimensional manner.

The beam splitter 116 is provided between the diaphragm 114 and the master lens group 115 on an optical axis K.

The beam splitter 116 transmits a part (for example, 80% of subject light) of subject light entering the imaging optical system and passing through the diaphragm 114 as it is and reflects remaining light (for example, 20% of subject light) excluding the part of subject light in a direction orthogonal to the optical axis K on the reflective surface 116a.

The position of the beam splitter 116 is not limited to that shown in FIG. 14, and may be provided at the back of a lens of the imaging optical system closest to the subject side on the optical axis K.

The mirror 117 is provided on an optical path of light reflected on the reflective surface 116a of the beam splitter 116, and reflects light and makes light enter the condenser lens 118 of the AF unit 121.

The condenser lens 118 condenses light reflected on the mirror 117.

As shown in an enlarged front view in a broken line of FIG. 14, the separator lens 119 is constituted of two lenses 19R and 19L provided in one direction (in the example of FIG. 14, a horizontal direction) with the optical axis of the imaging optical system sandwiched therebetween.

Subject light condensed by the condenser lens 118 passes through the two lenses 19R and 19L, respectively, and forms images at different positions of the light receiving surface (a surface on which a plurality of pixels are provided) of the imaging element 120. That is, on the light receiving surface of the imaging element 120, a pair of subject light images deviated in one direction are formed.

The beam splitter 116, the mirror 117, the condenser lens 118, and the separator lens 119 function as optical elements which make a part of subject light incident on the imaging optical system enter an imaging element 310 of the camera device 300 capturing a subject light image through the imaging optical system and make remaining light excluding the part of subject light enter the imaging element 120.

A configuration may be made in which the mirror 117 is removed and light reflected on the beam splitter 116 is made directly enter the condenser lens 118.

The imaging element 120 is an area sensor in which a plurality of pixels are arranged in a two-dimensional manner on the light receiving surface, and outputs image signals according to the respective two subject light images formed on the light receiving surface.

That is, the imaging element 120 outputs a pair of image signals deviated in the horizontal direction for one subject light image formed by the imaging optical system.

An area sensor is used as the imaging element 120, whereby it is possible to avoid difficulty in accurately aligning the positions of line sensors compared to a configuration in which line sensors are used.

Each pixel which outputs one of a pair of captured image signals deviated in the horizontal direction among the pixels included in the imaging element 120 constitutes a first signal detection unit which receives one luminous flux of a pair of luminous fluxes passing through two different portions arranged in the horizontal direction of the pupil area of the imaging optical system and detects a signal according to the amount of received light.

Each pixel which outputs the other image signal of a pair of captured image signals deviated in the horizontal direction among the pixels included in the imaging element 120 constitutes a second signal detection unit which receives the other luminous flux of a pair of luminous fluxes passing through two different portions arranged in the horizontal direction of the pupil area of the imaging optical system and detects a signal according to the amount of received light.

Here, although the imaging element 120 is constituted as an area sensor, instead of the imaging element 120, a configuration may be made in which a line sensor having a plurality of pixels constituting the first signal detection units arranged in the horizontal direction is provided at a position facing the lens 19R and a line sensor having a plurality of pixels constituting the second signal detection units arranged in the horizontal direction is provided at a position facing the lens 19R.

The camera device 300 includes the imaging element 310, such as a CCD image sensor or a CMOS image sensor, which is provided on the optical axis K of the lens device 100, and an image processing unit 320 which processes an image signal obtained by capturing a subject light image with the imaging element 310 to generate captured image data.

The block configuration of the lens device 100 is the same as that of the lens device of FIG. 1, and includes a drive unit which drives the focus lens 111, and a system control unit which controls the drive unit.

The system control unit executes the focusing control program, and functions as the filter processing unit 11a, the correlation calculation unit 11b, and the lens position control unit 11c.

However, the first signal group and the second signal group which are input to the system control unit are signals output from the first signal detection units and the second signal detection units of the imaging element 120. In this camera system, the system control unit of the lens device 100 functions as a focusing control device.

In a camera system for business use, moving image capturing is a basic way of using. For this reason, focusing control by the system control unit 11 of the digital camera described referring to FIGS. 1 to 13 becomes particularly effective. In the camera system of FIG. 14, a gyro sensor for detecting the movement amount of the subject is provided in the lens device.

As described above, the following matters are disclosed in this specification.

Disclosed is a focusing control device comprising a plurality of first signal detection units which receive one of a pair of luminous fluxes passing through different portions arranged in one direction of a pupil area of an imaging optical system including a focus lens and detect signals according to the amount of received light, a plurality of second signal detection units which receive the other luminous flux of the pair of luminous fluxes and detect signals according to the amount of received light, a filter processing unit which performs first filter processing selected from among a plurality of kinds of filter processing on each of a first signal group output from the plurality of first signal detection units and a second signal group output from the plurality of second signal detection units, a correlation calculation unit which performs correlation calculation of the first signal group after the first filter processing by the filter processing unit and the second signal group after the first filter processing by the filter processing unit, and a lens position control unit which controls the position of the focus lens based on the result of the correlation calculation by the correlation calculation unit. The filter processing unit selects the first filter processing from among the plurality of kinds of filter processing based on subject condition information.

In the disclosed focusing control device, the plurality of kinds of filter processing include differential filter processing and integral filter processing.

In the disclosed focusing control device, the subject condition information includes contrast of a subject, and the filter processing unit selects the integral filter processing in a case where a state of the contrast being equal to or less than a first threshold value is continued with a frequency equal to or greater than a second threshold value, and selects the differential filter processing in a case where the contrast exceeds the first threshold value.

In the disclosed focusing control device, the subject condition information includes brightness of a subject, and the filter processing unit selects the integral filter processing in a case where a state of the brightness being equal to or less than a third threshold value is continued with a frequency equal to or greater than a fourth threshold value, and selects the differential filter processing in a case where the brightness exceeds the third threshold value.

In the disclosed focusing control device, the subject condition information includes a spatial frequency of a subject, and the filter processing unit selects the integral filter processing in a case where a state of the spatial frequency being equal to or greater than a fifth threshold value is continued with a frequency equal to or greater than a sixth threshold value, and selects the differential filter processing in a case where the spatial frequency is less than the fifth threshold value.

The disclosed focusing control device further comprises a movement detection unit which detects movement of an electronic device having the focusing control device, the subject condition information includes a movement amount which is detected by the movement detection unit, and the filter processing unit selects the integral filter processing in a case where a state of the movement amount being equal to or greater than a seventh threshold value is continued with a frequency equal to or greater than an eighth threshold value, and selects the differential filter processing in a case where the movement amount is less than the seventh threshold value.

Disclosed is a lens device comprising the above-described focusing control device, and the above-described imaging optical system.

Disclosed is an imaging device comprising the above-described focusing control device.

Disclosed is a focusing control method comprising a filter processing step of performing first filter processing selected from among a plurality of kinds of filter processing on each of a first signal group output from a plurality of first signal detection units configured to receive one of a pair of luminous fluxes passing through different portions arranged in one direction of a pupil area of an imaging optical system including a focus lens and detect signals according to the amount of received light and a second signal group output from a plurality of second signal detection units configured to receive the other luminous flux of the pair of luminous fluxes and detect signals according to the amount of received light, a correlation calculation step of performing correlation calculation of the first signal group after the first filter processing in the filter processing step and the second signal group after the first filter processing in the filter processing step, and a lens position control step of controlling the position of the focus lens based on the result of the correlation calculation in the correlation calculation step. In the filter processing step, the first filter processing is selected from among the plurality of kinds of filter processing based on subject condition information.

In the disclosed focusing control method, the plurality of kinds of filter processing include differential filter processing and integral filter processing.

In the disclosed focusing control method, the subject condition information includes contrast of a subject, and in the filter processing step, the integral filter processing is selected in a case where a state of the contrast being equal to or less than a first threshold value is continued with a frequency equal to or greater than a second threshold value, and the differential filter processing is selected in a case where the contrast exceeds the first threshold value.

In the disclosed focusing control method, the subject condition information includes brightness of a subject, and in the filter processing step, the integral filter processing is selected in a case where a state of the brightness being equal to or less than a third threshold value is continued with a frequency equal to or greater than a fourth threshold value, and the differential filter processing is selected in a case where the brightness exceeds the third threshold value.

In the disclosed focusing control method, the subject condition information includes a spatial frequency of a subject, and in the filter processing step, the integral filter processing is selected in a case where a state of the spatial frequency being equal to or greater than a fifth threshold value is continued with a frequency equal to or greater than a sixth threshold value, and the differential filter processing is selected in a case where the spatial frequency is less than the fifth threshold value.

In the disclosed focusing control method, the subject condition information includes a movement amount of an electronic device having the imaging optical system, and in the filter processing step, the integral filter processing is selected in a case where a state of the movement amount being equal to or greater than a seventh threshold value is continued with a frequency equal to or greater than an eighth threshold value, and the differential filter processing is selected in a case where the movement amount is less than the seventh threshold value.

Disclosed is a focusing control program which causes a computer to execute a filter processing step of performing first filter processing selected from among a plurality of kinds of filter processing on each of a first signal group output from a plurality of first signal detection units configured to receive one of a pair of luminous fluxes passing through different portions arranged in one direction of a pupil area of an imaging optical system including a focus lens and detect signals according to the amount of received light and a second signal group output from a plurality of second signal detection units configured to receive the other luminous flux of the pair of luminous fluxes and detect signals according to the amount of received light, a correlation calculation step of performing correlation calculation of the first signal group after the first filter processing in the filter processing step and the second signal group after the first filter processing in the filter processing step, and a lens position control step of controlling the position of the focus lens based on the result of the correlation calculation in the correlation calculation step. In the filter processing step, the first filter processing is selected from among the plurality of kinds of filter processing based on subject condition information.

The present invention is applied to, in particular, a television camera for broadcasting or the like primarily involved in moving image capturing, thereby achieving high convenience and effectiveness.

EXPLANATION OF REFERENCES

1: imaging lens
5: imaging element 52A, 52B: phase difference detection pixel
11: system control unit
11a: filter processing unit
11b: correlation calculation unit
11c: lens position control unit
30: gyro sensor

What is claimed is:

1. A focusing control device comprising:
a plurality of first signal detection units which comprise phase difference detection pixels and receive one of a pair of luminous fluxes passing through different portions arranged in one direction of a pupil area of an imaging optical system including a focus lens and detect signals according to the amount of received light;
a plurality of second signal detection units which comprise phase difference detection pixels and receive the other luminous flux of the pair of luminous fluxes and detect signals according to the amount of received light; and
a system control unit comprising a processor configured to control:
 a filter processing unit which performs first filter processing selected from among a plurality of kinds of filter processing on each of a first signal group output from the plurality of first signal detection units and a second signal group output from the plurality of second signal detection units;
 a correlation calculation unit which performs correlation calculation of the first signal group after the first filter processing by the filter processing unit and the second signal group after the first filter processing by the filter processing unit; and
 a lens position control unit which controls the position of the focus lens based on the result of the correlation calculation by the correlation calculation unit,
wherein,
the filter processing unit selects the first filter processing from among the plurality of kinds of filter processing based on subject condition information;
the plurality of kinds of filter processing include differential filter processing and integral filter processing;
the subject condition information includes contrast of a subject determined based on the result of the correlation calculation; and
 the filter processing unit selects the integral filter processing in a case where a state of the contrast being equal to or less than a first threshold value is continued with a frequency equal to or greater than a second threshold value, and selects the differential filter processing in a case where the contrast exceeds the first threshold value.

2. A lens device comprising:
the focusing control device according to claim 1; and
the imaging optical system.

3. An imaging device comprising:
the focusing control device according to claim 1.

4. A focusing control method using the focusing control device according to claim 1 comprising:
a filter processing step of performing first filter processing selected from among the plurality of kinds of filter processing on each of a first signal group output from the plurality of first signal detection units configured to receive one of a pair of luminous fluxes passing through different portions arranged in one direction of the pupil area of the imaging optical system including the focus lens and detect signals according to the amount of received light and the second signal group output from the plurality of second signal detection units configured to receive the other luminous flux of the pair of luminous fluxes and detect signals according to the amount of received light;
a correlation calculation step of performing the correlation calculation of the first signal group after the first filter processing in the filter processing step and the second signal group after the first filter processing in the filter processing step; and
a lens position control step of controlling the position of the focus lens based on the result of the correlation calculation in the correlation calculation step,
wherein, in the filter processing step, the first filter processing is selected from among the plurality of kinds of filter processing based on the subject condition information;
the plurality of kinds of filter processing include differential filter processing and integral filter processing; and
in the filter processing step, the integral filter processing is selected in a case where a state of the contrast being equal to or less than the first threshold value is continued with a frequency equal to or greater than the second threshold value, and the differential filter processing is selected in a case where the contrast exceeds the first threshold value.

5. A non-transitory computer readable medium having a focusing control program which causes a computer to execute the focusing control method according to claim 4.

6. A focusing control device comprising:
a plurality of first signal detection units which comprise phase difference detection pixels and receive one of a pair of luminous fluxes passing through different portions arranged in one direction of a pupil area of an imaging optical system including a focus lens and detect signals according to the amount of received light;
a plurality of second signal detection units which comprise phase difference detection pixels and receive the other luminous flux of the pair of luminous fluxes and detect signals according to the amount of received light; and
a system control unit comprising a processor configured to control:
 a filter processing unit which performs first filter processing selected from among a plurality of kinds of filter processing on each of a first signal group output from the plurality of first signal detection units and a second signal group output from the plurality of second signal detection units;
 a correlation calculation unit which performs correlation calculation of the first signal group after the first filter processing by the filter processing unit and the second signal group after the first filter processing by the filter processing unit; and
 a lens position control unit which controls the position of the focus lens based on the result of the correlation calculation by the correlation calculation unit,
wherein,
the filter processing unit selects the first filter processing from among the plurality of kinds of filter processing based on subject condition information;
the plurality of kinds of filter processing include differential filter processing and integral filter processing;
the subject condition information includes brightness of a subject; and the filter processing unit selects the integral filter processing in a case where a state of the brightness being equal to or less than a third threshold value is continued with a frequency equal to or greater than a fourth threshold value, and selects the differential filter processing in a case where the brightness exceeds the third threshold value.

7. A lens device comprising:
the focusing control device according to claim 6; and
the imaging optical system.

8. An imaging device comprising:
the focusing control device according to a claim 6.

9. A focusing control method using the focusing control device according to claim 6 comprising:
a filter processing step of performing first filter processing selected from among the plurality of kinds of filter processing on each of a first signal group output from the plurality of first signal detection units configured to receive one of a pair of luminous fluxes passing through different portions arranged in one direction of the pupil area of the imaging optical system including the focus lens and detect signals according to the amount of received light and the second signal group output from the plurality of second signal detection units configured to receive the other luminous flux of the pair of luminous fluxes and detect signals according to the amount of received light;
a correlation calculation step of performing the correlation calculation of the first signal group after the first filter processing in the filter processing step and the second signal group after the first filter processing in the filter processing step; and
a lens position control step of controlling the position of the focus lens based on the result of the correlation calculation in the correlation calculation step,
wherein, in the filter processing step, the first filter processing is selected from among the plurality of kinds of filter processing based on the subject condition information;
the plurality of kinds of filter processing include differential filter processing and integral filter processing; and
in the filter processing step, the integral filter processing is selected in a case where a state of the brightness being equal to or less than the third threshold value is continued with a frequency equal to or greater than the fourth threshold value, and the differential filter processing is selected in a case where the brightness exceeds the third threshold value.

10. A non-transitory computer readable medium having a focusing control program which causes a computer to execute the focusing control method according to claim 9.

11. A focusing control device comprising:
a plurality of first signal detection units which comprise phase difference detection pixels and receive one of a pair of luminous fluxes passing through different portions arranged in one direction of a pupil area of an imaging optical system including a focus lens and detect signals according to the amount of received light;
a plurality of second signal detection units which comprise phase difference detection pixels and receive the other luminous flux of the pair of luminous fluxes and detect signals according to the amount of received light; and
a system control unit comprising a processor configured to control:

a filter processing unit which performs first filter processing selected from among a plurality of kinds of filter processing on each of a first signal group output from the plurality of first signal detection units and a second signal group output from the plurality of second signal detection units;
a correlation calculation unit which performs correlation calculation of the first signal group after the first filter processing by the filter processing unit and the second signal group after the first filter processing by the filter processing unit; and
a lens position control unit which controls the position of the focus lens based on the result of the correlation calculation by the correlation calculation unit,
wherein,
the filter processing unit selects the first filter processing from among the plurality of kinds of filter processing based on subject condition information;
the plurality of kinds of filter processing include differential filter processing and integral filter processing;
the subject condition information includes a spatial frequency of a subject; and
the filter processing unit selects the integral filter processing in a case where a state of the spatial frequency being equal to or greater than a fifth threshold value is continued with a frequency equal to or greater than a sixth threshold value, and selects the differential filter processing in a case where the spatial frequency is less than the fifth threshold value.

12. A lens device comprising:
the focusing control device according to claim 11; and
the imaging optical system.

13. An imaging device comprising:
the focusing control device according to claim 11.

14. A focusing control method using the focusing control device according to claim 11 comprising:
a filter processing step of performing first filter processing selected from among the plurality of kinds of filter processing on each of a first signal group output from the plurality of first signal detection units configured to receive one of a pair of luminous fluxes passing through different portions arranged in one direction of the pupil area of the imaging optical system including the focus lens and detect signals according to the amount of received light and the second signal group output from the plurality of second signal detection units configured to receive the other luminous flux of the pair of luminous fluxes and detect signals according to the amount of received light;
a correlation calculation step of performing the correlation calculation of the first signal group after the first filter processing in the filter processing step and the second signal group after the first filter processing in the filter processing step; and
a lens position control step of controlling the position of the focus lens based on the result of the correlation calculation in the correlation calculation step,
wherein, in the filter processing step, the first filter processing is selected from among the plurality of kinds of filter processing based on the subject condition information;
the plurality of kinds of filter processing include differential filter processing and integral filter processing; and
in the filter processing step, the integral filter processing is selected in a case where a state of the spatial frequency being equal to or greater than the fifth threshold value is continued with a frequency equal to or greater than the sixth threshold value, and the differential filter processing is selected in a case where the spatial frequency is less than the fifth threshold value.

15. A non-transitory computer readable medium having a focusing control program which causes a computer to execute the focusing control method according to claim 14.

16. A focusing control device comprising:
a plurality of first signal detection units which comprise phase difference detection pixels and receive one of a pair of luminous fluxes passing through different portions arranged in one direction of a pupil area of an imaging optical system including a focus lens and detect signals according to the amount of received light;
a plurality of second signal detection units which comprise phase difference detection pixels and receive the other luminous flux of the pair of luminous fluxes and detect signals according to the amount of received light; and
a system control unit comprising a processor configured to control:
a filter processing unit which performs first filter processing selected from among a plurality of kinds of filter processing on each of a first signal group output from the plurality of first signal detection units and a second signal group output from the plurality of second signal detection units;
a correlation calculation unit which performs correlation calculation of the first signal group after the first filter processing by the filter processing unit and the second signal group after the first filter processing by the filter processing unit;
a lens position control unit which controls the position of the focus lens based on the result of the correlation calculation by the correlation calculation unit; and
a movement detection unit which detects movement of an electronic device having the focusing control device,
wherein,
the filter processing unit selects the first filter processing from among the plurality of kinds of filter processing based on subject condition information;
the plurality of kinds of filter processing include differential filter processing and integral filter processing;
the subject condition information includes a movement amount which is detected by the movement detection unit; and
the filter processing unit selects the integral filter processing in a case where a state of the movement amount being equal to or greater than a seventh threshold value is continued with a frequency equal to or greater than an eighth threshold value, and selects the differential filter processing in a case where the movement amount is less than the seventh threshold value.

17. A lens device comprising:
the focusing control device according to claim 16; and
the imaging optical system.

18. An imaging device comprising:
the focusing control device according to claim 16.

19. A focusing control method using the focusing control device according to claim 16 comprising:
a filter processing step of performing first filter processing selected from among the plurality of kinds of filter processing on each of a first signal group output from the plurality of first signal detection units configured to receive one of a pair of luminous fluxes passing through different portions arranged in one direction of the pupil area of the imaging optical system including the focus lens and detect signals according to the amount of received light and the second signal group output from the plurality of second signal detection units configured to receive the other luminous flux of the pair of luminous fluxes and detect signals according to the amount of received light;
a correlation calculation step of performing the correlation calculation of the first signal group after the first filter processing in the filter processing step and the second signal group after the first filter processing in the filter processing step; and
a lens position control step of controlling the position of the focus lens based on the result of the correlation calculation in the correlation calculation step,
wherein, in the filter processing step, the first filter processing is selected from among the plurality of kinds of filter processing based on the subject condition information;
the plurality of kinds of filter processing include differential filter processing and integral filter processing;
the subject condition information includes a movement amount of the electronic device having the imaging optical system; and
in the filter processing step, the integral filter processing is selected in a case where a state of the movement amount being equal to or greater than the seventh threshold value is continued with a frequency equal to or greater than an eighth threshold value, and the differential filter processing is selected in a case where the movement amount is less than the seventh threshold value.

20. A non-transitory computer readable medium having a focusing control program which causes a computer to execute the focusing control method according to claim 19.

* * * * *